United States Patent [19]

Heck, III

[11] 4,259,453

[45] Mar. 31, 1981

[54] ACTIVATION OF BLOWING AGENTS

[75] Inventor: Rhomie L. Heck, III, Naugatuck, Conn.

[73] Assignee: Uniroyal, Inc., New York, N.Y.

[21] Appl. No.: 156,291

[22] Filed: Jun. 4, 1980

[51] Int. Cl.$^3$ ............................................. C08J 9/10
[52] U.S. Cl. .............................. 521/85; 264/DIG. 5; 521/87; 521/88; 521/92; 521/93; 521/98; 521/134; 521/143; 521/180; 521/182; 521/184; 521/909
[58] Field of Search ................... 521/85, 92, 93, 95, 521/87, 88, 98, 180, 182, 184, 909; 264/DIG. 5

[56] References Cited

U.S. PATENT DOCUMENTS

| | | | |
|---|---|---|---|
| 3,554,937 | 1/1971 | Codus et al. | 521/79 |
| 3,876,622 | 4/1975 | Motokawa et al. | 264/DIG. 5 |
| 3,888,801 | 6/1975 | Hunter | 521/95 |

*Primary Examiner*—Morton Foelak
*Attorney, Agent, or Firm*—Anthony Lagani, Jr.; Alfred H. Hemingway

[57] ABSTRACT

A composition comprising a gas-expandable polymeric material and an activated hydrazodicarboxylate blowing agent, wherein the activator is selected from nickelbis(3,5-di-t-butyl-4-hydroxybenzoate), a mixture of 2-hydroxy-4-n-octoxybenzophenone and nickelbis(2-oxy-4-n-octoxybenzophenone), nickel stearate, nickel trifluoroacetylacetonate, [2,2'-thiobis(4-t-thiobis(4-t-octylphenolato)]nickel, nickelbis [O-ethyl-(3,5-di-t-butyl-4-hydroxybenzyl)phosphonate], nickelammoniumsulfate, ethylenediaminetetra(methylenephosphonic acid), and hexamethylenediaminetetra(methylenephosphonic acid).

8 Claims, No Drawings

ACTIVATION OF BLOWING AGENTS

The present invention relates to the production of gas expanded polymeric materials with activated blowing agents. Activation of a blowing agent is often desired to extend the range of temperatures within which the blowing agent might effectively be used for the expansion of polymeric materials. The activator catalyzes the decomposition of the blowing agent, causing it to decompose, and thus evolve gases, at temperatures below its normal decomposition temperature.

The use of hydrazodicarboxylates as blowing agents is disclosed in U.S. Pat. Nos. 3,554,937 and 3,888,801, the disclosures of which are hereby incorporated herein by reference. It has surprisingly been found that hydrazodicarboxylate blowing agents may be activated by certain additives.

The composition of the present invention comprises a gas-expandable polymeric material and an activated hydrazodicarboxylate blowing agent. The present invention also relates to a process for expanding a gas-expandable polymeric material comprising incorporating with said polymeric material an activated hydrazodicarboxylate blowing agent and heating the resulting mixture to a temperature at which said activated hydrazodicarboxylate blowing agent decomposes.

The preferred blowing agents are hydrazodicarboxylates having the formula $$ROOC-N(H)-N(H)-COOR' \quad (I)$$

wherein R and R' are the same or different and each is linear or branched alkyl having 1 to 8 carbon atoms, cycloalkyl having 3 to 8 carbon atoms, aryl having 6 to 10 carbon atoms (e.g. phenyl or naphthyl), alkaryl having 7 to 10 carbon atoms, or aralkyl having 7 to 10 carbon atoms. More preferably, at least one of R and R' is secondary or tertiary alkyl having 3 to 5 carbon atoms and the other of R and R' is primary, secondary or tertiary straight-chain or branched-chain alkyl having 1 to 8 carbon atoms, cycloalkyl having 5 to 8 carbons, aryl having 6 to 10 carbons, alkaryl having 7 to 10 carbon atoms or aralkyl having 7 to 10 carbon atoms. Most preferable are those compounds of the formula I wherein at least one of R and R' is isopropyl, secondary butyl or tertiary butyl and the other of R and R' is alkyl having 1 to 4 carbon atoms. Even more preferred than the latter compounds are those compounds of the formula I wherein both R and R' are the same or different and are isopropyl, secondary butyl or tertiary butyl.

The activators of the present invention are nickelbis(3,5-di-t-butyl-4-hydroxybenzoate) (Compound A), a mixture of 2-hydroxy-4 n-octoxybenzophenone and its relative nickel chelate nickelbis (2-oxy-4-n-octoxybenzophenone) (collectively referred to as Compound B), nickel stearate (Compound C), nickel trifluoroacetylacetonate (Compound D), [2,2'-thiobis(4-t-octylphenolato]nickel (Compound E), nickelbis]O-ethyl-(3,5-di-t-butyl-4-hydroxybenzyl)phosphonate] (Compound F), nickelammoniumsulfate (Compound G), ethylenediaminetetra(methylenephosphonic acid) (Compound H), and hexamethylenediaminetetra(methylenephosponic acid) (Compound I). The formulae of the activators are as follows:

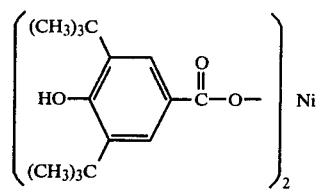

Compound A

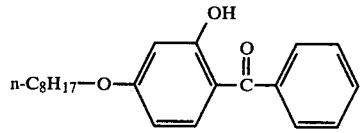

mixed with

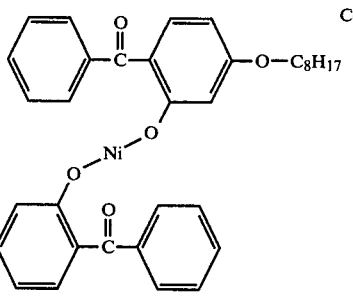

Compound B

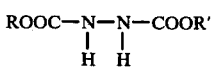

Compound C

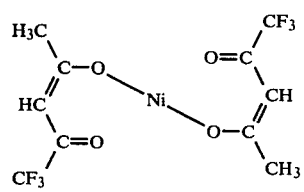

Compound D

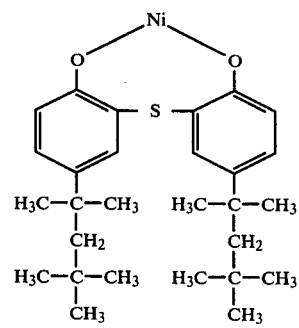

Compound E

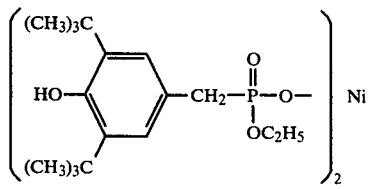

Compound F

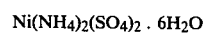

Compound G

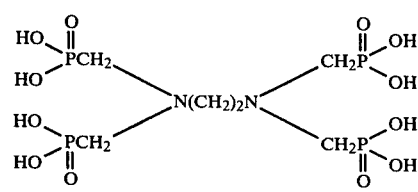

Compound H

-continued

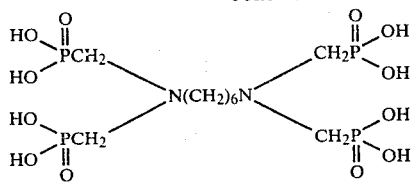
Compound I

Use of the activators of the present invention renders the blowing agent more suitable for use in the expansion of thermoplastic polymers processed from 250° C. to 270° C., for example, polybutyleneterephthalate (PBT), aromatic polyesters and copolyesters, nylons 6, 6/6, 6/9, 6/12, 11 and 12, polycarbonates, aromatic polyamides, polyamides, ABS, phenylene oxide-based resins, polycarbonate-ABS alloys (e.g., ARYLON T), and polyolefins.

In choosing an activator, it is preferable that the activator have a physical form similar to that of the blowing agent, to allow the two to be admixed thoroughly and easily. Further, it is preferred that the activator and blowing agent be mixed together before addition to the polymer to insure optimum effect of the activator on the blowing agent's decomposition temperature. The ratio of activator to blowing agent may vary, but it is dependent upon the degree of activation desired. Generally, a ratio of 1:1 to 1:9, by weight, is preferred. The following non-limiting examples are illustrative of the present invention.

EXAMPLE I—Increased Evolution Of Gas At 260° C. Through The Addition Of Activators Separate blends of diisopropylhydrazodicarboxylate (DIHC) with compounds A, B, C, D, E, F, G, H, and I were prepared using a Waring (TM) blender. A ratio of 1:1 (activator to DIHC) was used in each instance.

The amount of gas evolved by each of the blends was measured, as described below, using a gas evolution apparatus.

A 0.4 gram sample of each blend was weighed and placed into a 25 ml volumetric flask. Using a syringe, 5 ml of paraffin oil were also placed into the 25 ml volumetric flask to act as a heat transfer medium. The flask was then attached to one end of a narrow glass joint. On the other end of the glass joint, a rubber septum was placed. A syringe needle attached to flexible tubing was inserted through the septum. The opposite end of the flexible tubing was then attached to a 50 ml syringe via a Luer lock. Placed atop the plunger of the 50 ml syringe was a linear potentiometer connected to a chart recorder.

The 25 ml volumetric flask containing the sample was then lowered into a constant-temperature oil bath heated to 260° C. As decomposition of the sample occurred, the gases evolved were routed through the flexible tubing to the 50 ml syringe. As the syringe became filled with the decomposition gases, the resulting movement of the plunger was sensed by the potentiometer and was converted into a graphic deflection by the recorder. Using the recorded deflection, the sample weight, barometric pressure, and ambient temperature, the gas evolution for each sample at S.T.P. was calculated. The results are given in Table I.

TABLE I

| Gas Evolution At S.T.P. For DIHC With Activators At 260° C. | |
|---|---|
| Samples | Gas Evolution, *cc's/gram |
| DIHC | 120.7 |
| DIHC + Compound A | 226.9 |
| DIHC + Compound B | 142.3 |
| DIHC + Compound C | 159.3 |
| DIHC + Compound D | 201.8 |
| DIHC + Compound E | 135.5 |
| DIHC + Compound F | 250.3 |
| DIHC + Compound G | 160.1 |
| DIHC + Compound H | 235 |
| DIHC + Compound I | 161.6 |

*Units are cubic centimeters of gas evolved per gram of DIHC present.

EXAMPLE II—Reduction In Decomposition Temperature Range Of DIHC Through The Use Of Activators DIHC was blended with each of Compounds A-I listed in Example I at a 1:1 ratio (by weight) in a Waring (TM) blender. The decomposition point of each blend was then determined using a Thomas Hoover (TM) capillary melting point apparatus, Model No. 6404-K.

The decomposition point was the temperature at which a constant and rapid evolution of gas bubbles was observed from each sample after the melting point of DIHC or of the blend had been reached and exceeded.

In each instance, the blend of DIHC plus activator had a lower decomposition temperature than DIHC alone. The results are summarized in Table II.

TABLE II

| Reduction In Decomposition Temperature Of DIHC Through The Addition Of Activators | | |
|---|---|---|
| Sample | Melting Point, °C. | Decomposition Point, °C. |
| DIHC | 108 | 270 |
| DIHC + Compound A | 97 | 215 |
| DIHC + Compound B | 50 | 225 |
| DIHC + Compound C | 110 | 200 |
| DIHC + Compound D | 100 | 155 |
| DIHC + Compound E | 97 | 230 |
| DIHC + Compound F | 97 | 180 |
| DIHC + Compound G | 108 | 210 |
| DIHC + Compound H | 108 | 250 |
| DIHC + Compound I | 100 | 237 |

In the following example, compositions and processes according to the invention are utilized via a processing technique involving a reciprocating screw injection molding machine. Some of the suitable alternative techniques would include, for example, extrusion, coextrusion, rotational and compression molding and expansion casting.

EXAMPLE III—Expansion of a Polymeric Material Using DIHC with Activators

A. Polybutyleneterephthalate (PBT) containing 30% glass fiber (specific gravity=1.55) was expanded in a Negri Bossi (TM) reciprocating screw injection molding machine (Model No. V17110) using DIHC blended with activators. DIHC without an activator was also used under essentially identical conditions for the purpose of comparison.

The molding conditions used were as listed below:
Machine Barrel Temperatures, front to rear—250-243-237° C.
Mold Temperature—79° C.
Injection Pressure—1450 psi (10MPa)

Back Pressure—100 psi (0.69MPa)
Injection Speed—1.5-2.0 seconds
Screw Speed—60 rpm
Screw Forward Time—30 seconds
Cooling Time—90 seconds
Mold - Steel with $4\frac{1}{2}''\times 4\frac{1}{2}''\times\frac{1}{4}''$ cavity (11.43 cm×11.43 cm×0.635 cm)

The blowing agents and/or blends were used at an addition level of 0.5 parts by weight per 100 parts by weight of PBT. The method of addition was by dry tumbling onto the PBT pellets after the pellets had been dried at 120° C. for two hours.

The blowing agents and blends used were as listed below:
I. DIHC without an activator.
II. DIHC (9.0 parts)+Compound H (1.0 part).
III. DIHC (8.5 parts)+Compound H (1.5 parts).
IV. DIHC (7.5 parts)+Compound H (2.5 parts).
V. DIHC (7.0 parts)+Compound A (3.0 parts).
VI. DIHC (5.0 parts)+Compound H (5.0 parts).

Using the aforementioned materials and conditions, expanded PBT plaques were produced. The results are listed in Table III.

TABLE III

| Blend Used | Specific Gravity of Plaque | % Expansion |
| --- | --- | --- |
| I | 1.4 | 9.4 |
| II | 0.805 | 46 |
| III | 0.792 | 47 |
| IV | 0.877 | 42 |
| V | 1.12 | 31 |
| VI | 1.41 | 9.2 |

All expanded plaques had a fine, uniform cell structure, and were smooth with the characteristic visual splay patterns observed. Visual splay is the swirling effect on the surface of the foam produced by travel of blowing agent gases between the mold cavity surface and the surface of the molded part. No discoloration in the expanded plaques was observed except with blend V (DIHC at 7.0 parts+Compound A at 3.0 parts). Plaques expanded with Blend V exhibited a greenish discoloration due to the color of the nickel compound used as the activator.

It may be noted that in Table III Blend VI shows no improvement over Blend I in expansion, even though Blend VI contains an activator and Blend I does not. As pointed out above, each blend or blowing agent was used at a 0.5% level in the polymer. Where the blends are used, the actual level of blowing agent is not 0.5% but some figure less than that. For Blend VI, the actual amount of blowing agent present (0.25%) was substantially lower than the amount present when the other blends were used. Although activation did occur with Blend VI, the small amount of blowing agent present severely limited the percent expansion obtainable.

B. Using the conditions and glass-filled PBT material of Example IIIA, various proportions of PBT and Blend III were employed to yield the results shown in Table IV.

TABLE IV

| Sample | Specific Gravity of Plaque | % Expansion |
| --- | --- | --- |
| PBT | 1.55 | Nil |
| PBT + 0.1% Blend III | 1.46 | 6.6 |
| PBT + 1.0% Blend III | 0.71 | 54.2 |

EXAMPLE IV

Certain analogs of DIHC were tested with ethylenediamine tetra (methylenephosphonic acid) (Compound H) as outlined in Example I. The results of the tests are set forth below:

TABLE V

| Sample* | Gas Evolution (cm³/gm blowing agent) |
| --- | --- |
| DMHD | 139.3 |
| DMHD + Compound H | 237.3 |
| DEHD | 16.0 |
| DEHD + Compound H | 214.2 |
| DBHD | Nil |
| DBHD + Compound H | 66.5 |
| DPHD | Nil |
| DPHD + Compound H | 100.2 |
| DIBHD | Nil |
| DIBHD + Compound H | 83.3 |
| DPHHD | 37.3 |
| DPHHD + Compound H | 80.2 |

*Analogs Tested
DMHD = dimethylhydrazodicarboxylate
DEHD = diethylhydrazodicarboxylate
DBHD = di-n-butylhydrazodicarboxylate
DPHD = di-n-propylhydrazodicarboxylate
DIBHD = diisobutylhydrazodicarboxylate
DPHHD = diphenylhydrazodicarboxylate As can be seen, the addition of ethylenediaminetetra (methylenephosphonic acid) had a dramatic effect on the gas evolution of the DIHC analogs.

I claim:
1. A composition comprising a gas-expandable polymeric material, a hydrazodicarboxylate blowing agent of the formula

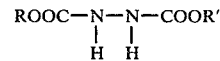

wherein R and R' are the same or different and each is linear or branched alkyl having 1 to 8 carbon atoms, cycloalkyl having 3 to 8 carbon atoms, aryl having 6 to 10 carbon atoms, alkaryl having 7 to 10 carbon atoms, or aralkyl having 7 to 10 carbon atoms and an activator for said blowing agent selected from nickelbis (3, 5-di-t-butyl-4-hydroxybenzoate), a mixture of 2-hydroxy-4-n-octoxybenzophenone and nickelbis (2-oxy-4-n-octoxybenzophenone), nickel stearate, nickel trifluoroacetylacetonate, nickel, nickelbis, nickelammoniumsulfate, ethylenediaminetetra (methylenephosphonic acid), and hexamethylenediaminetetra (methylenephosphonic acid).

2. A composition according to claim 1, wherein at least one of R and R' is secondary or tertiary alkyl having 3 to 5 carbon atoms and the other of R and R' is primary, secondary or tertiary straight-chain or branched-chain alkyl having 1 to 8 carbon atoms, cycloalkyl having 5 to 8 carbons, aryl having 6 to 10 carbons, alkaryl having 7 to 10 carbon atoms or aralkyl having 7 to 10 carbon atoms.

3. A composition according to claim 1, wherein at least one of R and R' is isopropyl, secondary butyl or tertiary butyl and the other of R and R' is alkyl having 1 to 4 carbon atoms.

4. A composition according to claim 1, wherein both R and R' are the same or different and are isopropyl, secondary butyl or tertiary butyl.

5. A process for expanding a gas-expandable polymeric material comprising incorporating with said polymeric material an activated hydrazodicarboxylate blowing agent of the formula

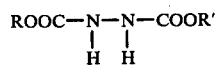

wherein R and R' are the same or different and each is linear or branched alkyl having 1 to 8 carbon atoms, cycloalkyl having 3 to 8 carbon atoms, aryl having 6 to 10 carbon atoms, alkaryl having 7 to 10 carbon atoms, or aralkyl having 7 to 10 carbon atoms and heating the resulting mixture to a temperature at which said activated hydrazodicarboxylate blowing agent decomposes, wherein the activator is selected from nickelbis(3, 5-di-t-butyl-4-hydroxybenzoate), a mixture of 2-hydroxy-4-n-octoxybenzophenone and nickelbis(2-oxy-4-n-octoxybenzophenone), nickel stearate, nickel trifluoroacetylacetonate, nickel, nickelbis, nickelammoniumsulfate, ethylenediaminetetra(methylenephosphonic acid), and hexamethylenediaminetetra(methylenephosphonic acid).

6. A process according to claim 4, wherein at least one of R and R' is secondary or tertiary alkyl having 3 to 5 carbon atoms and the other of R and R' is primary, secondary or tertiary straight-chain or branched-chain alkyl having 1 to 8 carbon atoms, cycloalkyl having 5 to 8 carbons, aryl having 6 to 10 carbons, alkaryl having 7 to 10 carbon atoms or aralkyl having 7 to 10 carbon atoms.

7. A process according to claim 4, wherein at least one of R and R' is isopropyl, secondary butyl or tertiary butyl and the other of R and R' is alkyl having 1 to 4 carbon atoms.

8. A process according to claim 4, wherein both R and R' are the same or different and are isopropyl, secondary butyl or tertiary butyl.

* * * * *